UNITED STATES PATENT OFFICE.

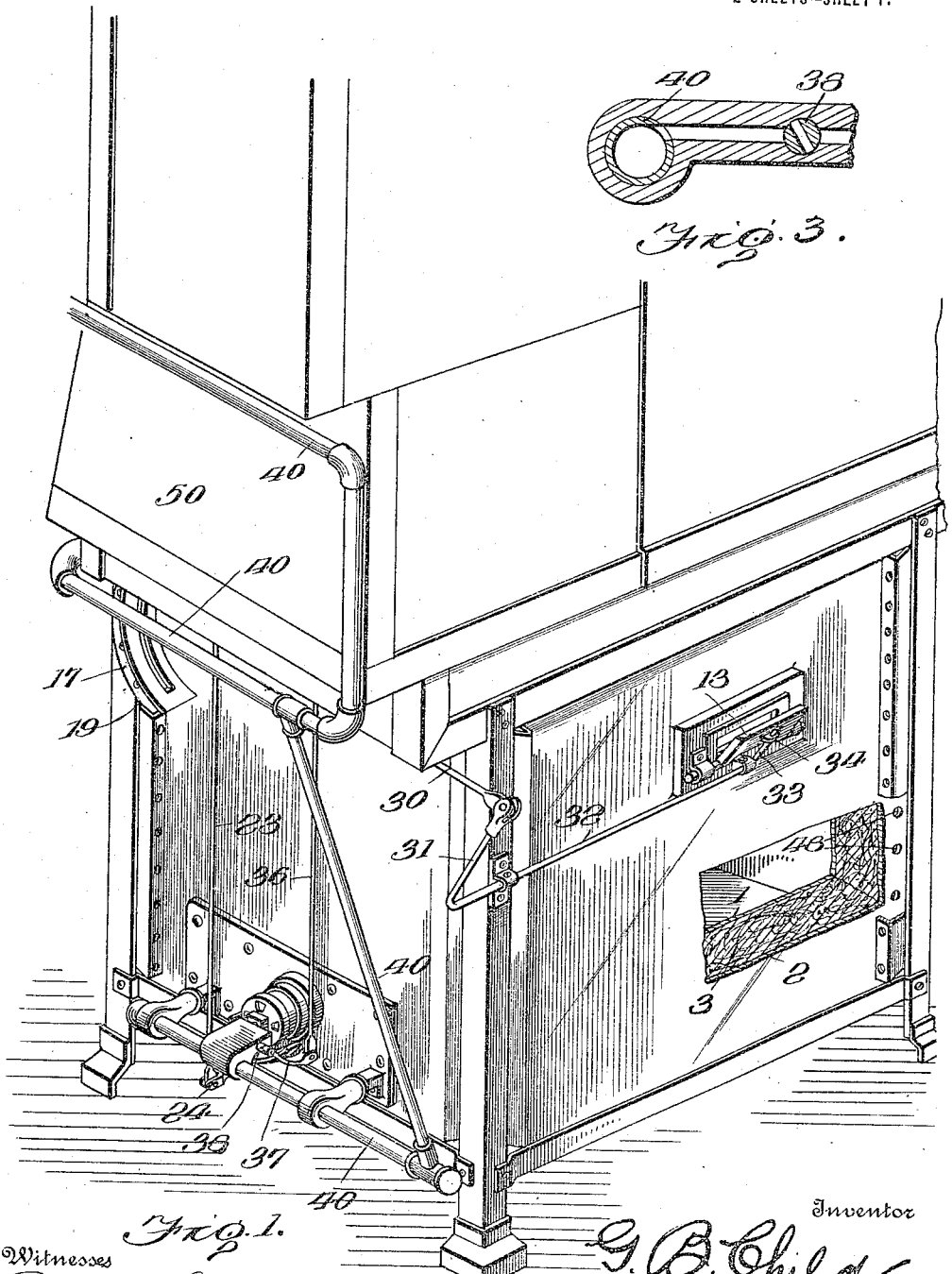

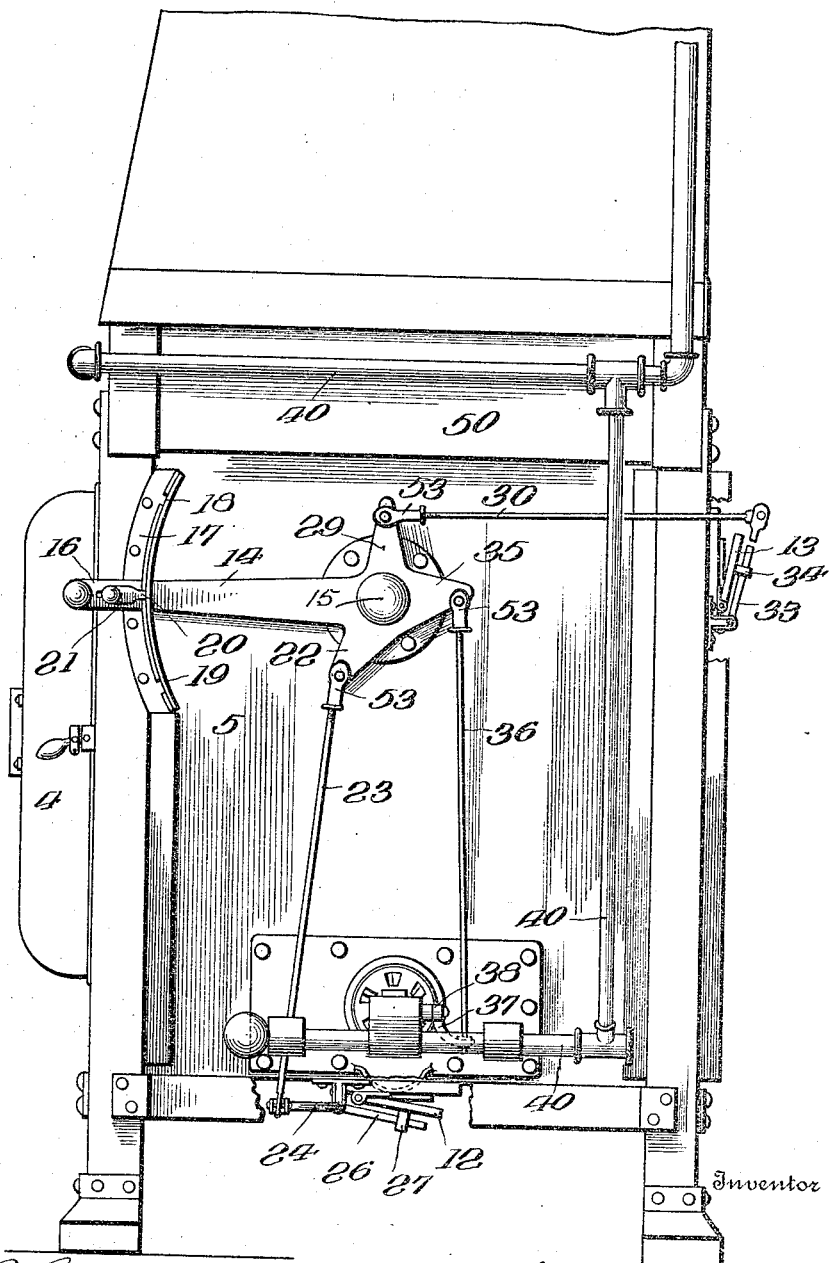

GUY B. CHILD, OF CHICAGO, ILLINOIS, ASSIGNOR TO AMERICAN STOVE COMPANY, OF ST. LOUIS, MISSOURI, A CORPORATION OF NEW JERSEY.

GAS COOKING-OVEN.

1,183,536. Specification of Letters Patent. Patented May 16, 1916.

Application filed December 27, 1915. Serial No. 68,703.

*To all whom it may concern:*

Be it known that I, GUY B. CHILD, a citizen of the United States, residing at Chicago, in the county of Cook and State of Illinois, have invented certain new and useful Improvements in Gas Cooking-Ovens, of which the following is a specification, reference being had therein to the accompanying drawing.

This invention relates to improvements in gas cooking ovens and has relation to that class of gas cooking ovens which are adapted to be operated upon the fireless cooker principle.

It pertains to that class of gas cooking ovens which are provided with means whereby when the gas is turned off from the burner, the oven is automatically tightly closed, whereby all circulation of air therethrough is prevented, and the heat retained therein for completing the cooking operation.

It is recognized that in ovens utilizing the fireless cooker principle, there will be a sudden escape or puff of the steam or moisture-ladened air from the tightly closed oven through the oven door opening into the face of the person using the cooker.

Another object of my invention is to provide means whereby the pressure in the oven can be relieved before the opening of the oven door, and to further accomplish this, through the mechanism that opens and closes the ventilation to the oven and without turning on the gas.

In the accompanying drawings, Figure 1 is an end perspective view partly in section of an oven embodying my invention. Fig. 2 is an end elevation partly in section of my improved oven. Fig. 3 is a sectional view of the ordinary gas valve used to control the flow of gas to the oven burner A hinged damper 12 controls the passage of fresh air into the bottom of the oven, and a hinged damper 13 controls the exit of the heated air from the top of the oven.

A lever 14 is pivoted to one end of the oven at 15, the handle end 16 of the lever extending to the front of the oven where it can be conveniently moved up and down, and a notched segment or plate 17 is carried by the end of the oven. This plate 17 is preferably formed on the arc of a circle of which the pivotal point is its center, and the upper end of the plate has a notch 18, its lower end a notch 19, and an intermediate or central notch 20. These notches are adapted to be engaged by a suitable spring detent 21 carried by the lever 14. This operating lever 14 is provided with a downwardly extending arm 22 that is connected with the inlet damper 12 through the medium of an adjustable link 23, and arm 24, the arm 24 being connected with or formed as a part of a shaft 25 which in turn has a second arm 26 that engages a lug 27 on the damper 12. The said lever 14 is also provided with an upwardly projecting arm 29, and this arm 29 is connected with the damper 13 by an adjustable link or rod 30, which in turn is connected with an arm 31 that is made as a part of a shaft 32, the opposite end of the shaft having a second arm 33 that passes through a lug 34 on the door 13. This same lever 14 has a third arm 35, which projects at the opposite side of the pivot 15, and is connected through the medium of an adjustable link or rod 36 with the arm 37 or a gas valve 38. This gas valve 38 controls the flow of gas to the burner pipes 39 located in the bottom of the oven, the gas being supplied through any desired arrangement of the gas manifold 40.

From the foregoing description, and referring more particularly to Fig. 2, the operation of this arrangement is as follows: With the operating lever 14 at the intermediate point as shown in this figure, the two dampers 12 and 13 are slightly opened, but the gas valve has not moved sufficiently far to open its orifice as shown in Fig. 3. With the parts in the position shown in Fig. 2, the pressure within the oven will be instantly relieved, and when the oven door 4 is opened, there will be no puff of moisture or steam ladened-air through the door opening into the face of the person opening the door. When the lever 14 is moved to its lowest position to bring the catch 21 in the notch 19, the gas valve and the dampers 12 and 13 will be closed. This will cut off the gas to the burner and close the oven. When the lever 14 is moved to its upper position with the catch 21 in the notch 18, the gas valve and the dampers 12 and 13 will be opened wide. The burner 39 will then be lighted through the oven door from any well known oven door lighter (not here shown).

In the use of this invention, the lever 14 is placed in its uppermost position, and the burner lighted. In this position there is a circulation of air through the oven to supply proper combustion for the burner, and the oven will be thus operated until the thermometer 41 indicates the desired amount of heat in the oven. When this point is reached, the lever 16 is moved to its lowermost position cutting off the gas and extinguishing the burner and closing the inlet and outlet openings 10 and 11 by closing the dampers 12 and 13. The heat is thus retained within the oven to complete the cooking operation. It is, of course, understood that the degree of heat to which the oven is raised, depends upon the kind of cooking to be done, and this is so well understood by those skilled in the art, that a further description or explanation thereof is unnecessary.

I do not claim herein broadly the idea of simultaneously operating the gas burner and the inlet and outlet dampers 12 and 13, my present improvement in that respect being the combined burner gas valve and the operating connections, whereby the dampers may be partially opened without opening the gas valve to relieve the pressure within the oven for the purposes before explained. The particular construction for operating the gas valve and dampers here shown is made the subject matter of a co-pending application Serial No. 819,273, filed February 17, 1914, and therefore there is no claim broadly herein for that arrangement.

For the purpose of enabling the dampers 12 and 13 to be tightly closed, which is desirable to accomplish the greatest efficiency, the rods 23, 30 and 36 are provided with adjustable heads 53 by means of which the said connections can be adjusted to effect a tight closing of the dampers when the gas valve is open. This construction is not only useful in the assembling of the structure, but will be useful to take up any wear or lost motion caused in the use of the oven. It will be readily understood to the extent that the dampers are not tightly closed, there will be an escape of the heat from the oven which should be prevented. By this adjustable arrangement, a proper tension can be placed on the damper connections when the catch 21 is snapped in the lower notch 19 of the segment 17, thus insuring at all times a tight closure of the inlet and outlet openings.

Having thus fully described my invention what I claim and desire to secure by Letters Patent is:

1. In a gas oven of the fireless cooker principle, the combination with an oven chamber, having at its bottom an inlet opening, and at its top an outlet opening, a damper for one of said openings, a burner for the oven, a gas valve for the burner, an operating member connected with the damper and with the gas valve, the gas ports of the valve adapted to permit the partial opening of the damper without opening the gas port.

2. In a gas oven of the fireless cooker principle, the combination with an oven chamber having at its bottom an inlet opening and at its upper portion an outlet opening, dampers controlling the said openings, a burner for the chamber, a gas valve for the burner, an operating member, and means connecting the operating member with the gas valve and one of said dampers, whereby the damper may be partially opened without opening the port of the gas valve.

3. In a gas oven of the fireless cooker principle, the combination of an oven chamber having an inlet opening at its bottom, and an outlet opening at its upper portion, dampers for the said openings, a burner for the said chamber, a gas valve for the burner, an operating member, and means connecting the valve and the dampers with the operating lever whereby the dampers may be partially opened without opening the port of the gas valve, for the purpose described.

4. In a gas oven of the fireless cooker principle, the combination with an oven chamber having an inlet opening at its bottom, and an outlet opening at its upper portion, dampers for said openings, a burner for the oven chamber, a gas valve for the burner, an operating lever having two arms respectively connected with the said dampers and a third arm connected with the gas valve, the gas port for the valve being so arranged that the dampers may be partially opened without opening the gas valve for the purposes described.

5. In a gas oven of the fireless cooker principle, the combination with an oven chamber having an inlet at its bottom, and an outlet at its upper portion, dampers for the said openings, a burner for the said chamber, a gas valve for the burner, an operating lever operatively connected with the gas valve and with the dampers, the gas port being so arranged that the dampers can be partially opened without opening the gas port, and means for locking the parts in said positions.

In testimony whereof I hereunto affix my signature in the presence of two witnesses.

GUY B. CHILD.

Witnesses:
 RORERT K. CLARK,
 A. F. MILLIKAN.